United States Patent
Unnimadhavan et al.

(10) Patent No.: US 9,408,061 B2
(45) Date of Patent: Aug. 2, 2016

(54) DISTRIBUTED NETWORK LAYER MOBILITY FOR UNIFIED ACCESS NETWORKS

(71) Applicant: Aruba Networks, Inc., Sunnyvale, CA (US)

(72) Inventors: Sandeep Unnimadhavan, Bangalore (IN); Santashil PalChaudhuri, West Bengal (IN)

(73) Assignee: ARUBA NETWORKS, INC., Sunnyvale, CA (US)

(*) Notice: Subject to any disclaimer, the term of this patent is extended or adjusted under 35 U.S.C. 154(b) by 254 days.

(21) Appl. No.: 13/829,720

(22) Filed: Mar. 14, 2013

(65) Prior Publication Data
US 2014/0269648 A1 Sep. 18, 2014

(51) Int. Cl.
| | | |
|---|---|---|
| H04W 8/14 | (2009.01) | |
| H04W 8/12 | (2009.01) | |
| H04W 8/20 | (2009.01) | |
| H04W 8/08 | (2009.01) | |
| H04L 12/46 | (2006.01) | |
| H04W 36/08 | (2009.01) | |

(52) U.S. Cl.
CPC .............. *H04W 8/12* (2013.01); *H04L 12/4641* (2013.01); *H04L 12/4679* (2013.01); *H04W 8/20* (2013.01); *H04L 12/467* (2013.01); *H04W 8/08* (2013.01); *H04W 36/08* (2013.01)

(58) Field of Classification Search
CPC ........... H04W 8/14; H04W 8/08; H04W 8/10; H04W 8/12; H04W 8/26; H04W 24/02; H04W 36/22; H04W 16/04; H04W 84/12; H04W 12/08; H04W 24/08; H04L 12/4641; H04L 41/0803; H04L 41/0659; H04L 41/0873; H04L 41/0893; H04L 43/0811; H04L 47/14; H04L 5/0048
See application file for complete search history.

(56) References Cited

U.S. PATENT DOCUMENTS

| | | | |
|---|---|---|---|
| 7,339,915 B2 * | 3/2008 | Jakkahalli et al. ............ | 370/338 |
| 7,596,614 B2 * | 9/2009 | Saunderson et al. .......... | 709/224 |
| 7,805,140 B2 * | 9/2010 | Friday .................... | H04W 48/20 370/338 |
| 8,588,088 B2 * | 11/2013 | Sinha ............................ | 370/252 |
| 8,730,963 B1 * | 5/2014 | Grosser et al. ................ | 370/392 |
| 8,942,167 B2 * | 1/2015 | Ankaiah ............. | H04L 12/4633 370/328 |
| 2005/0030946 A1 * | 2/2005 | Carty et al. .................... | 370/389 |
| 2007/0081477 A1 * | 4/2007 | Jakkahalli et al. ............ | 370/310 |
| 2007/0192862 A1 * | 8/2007 | Vermeulen et al. ............. | 726/23 |
| 2010/0290446 A1 * | 11/2010 | Atreya et al. .................. | 370/338 |
| 2011/0274082 A1 * | 11/2011 | Calhoun et al. ............... | 370/331 |
| 2012/0137288 A1 * | 5/2012 | Barrett et al. ..................... | 718/1 |
| 2012/0159245 A1 * | 6/2012 | Brownlow et al. .............. | 714/23 |
| 2013/0177022 A1 * | 7/2013 | Caffrey et al. ........... | 370/395.53 |

(Continued)

*Primary Examiner* — Bunjob Jaroenchonwanit
(74) *Attorney, Agent, or Firm* — Hewlett Packard Enterprise Patent Department (57) ABSTRACT

The present disclosure discloses a method and network device providing distributed network layer mobility for unified access networks. The method eliminates the need for a secure tunnel between a home network device and a foreign network device when a client roams from the home network device to the foreign network device. The disclosed network device receives an association request from a client device in a wireless network; identifies a first wireless virtual local area network (VLAN) that the client device is assigned to; and, allows traffic to or from the client device to be transmitted via the network device on the first wireless VLAN, wherein traffic on at least a second wireless VLAN is transmitted via the network device and segregated from the traffic on the first wireless VLAN.

21 Claims, 6 Drawing Sheets

(56) References Cited

U.S. PATENT DOCUMENTS

| | | | |
|---|---|---|---|
| 2013/0188625 A1* | 7/2013 | Setia et al. ................... 370/338 |
| 2013/0201979 A1* | 8/2013 | Iyer et al. ...................... 370/338 |
| 2014/0129855 A1* | 5/2014 | Hamdi et al. ................. 713/320 |
| 2014/0269648 A1* | 9/2014 | Unnimadhavan et al. .... 370/338 |

* cited by examiner

FIG. 1

| DEVICE 210 | PORT/TYPE 220 | VLAN CONFIGURED 230 |
|---|---|---|
| CORE SWITCH | PORT 1 | V1, V2 |
| CORE SWITCH | PORT 2 | V3, V4 |
| ACCESS SWITCH A | UPLINK | V1, V2 |
| ACCESS SWITCH B | UPLINK | V3, V4 |
| AP 1 | MANAGEMENT | V1 |
| AP 1 | SSID | V2 |
| AP 2 | MANAGEMENT | V1 |
| AP 2 | SSID | V2 |
| AP 3 | MANAGEMENT | V3 |
| AP 3 | SSID | V4 |
| AP 4 | MANAGEMENT | V3 |
| AP 4 | SSID | V4 |
| ... ... | ... ... | ... ... |

FIG. 2A

| DEVICE 240 | PORT/TYPE 250 | VLAN CONFIGURED 260 |
|---|---|---|
| CORE SWITCH | PORT 1 | V1, V2, V4 |
| CORE SWITCH | PORT 2 | V2, V3, V4 |
| ACCESS SWITCH A | UPLINK | V1, V2, V4 |
| ACCESS SWITCH B | UPLINK | V2, V3, V4 |
| AP 1 | MANAGEMENT | V1 |
| AP 1 | SSID | V2 |
| AP 2 | MANAGEMENT | V1 |
| AP 2 | SSID | V2 |
| AP 3 | MANAGEMENT | V3 |
| AP 3 | SSID | V4 |
| AP 4 | MANAGEMENT | V3 |
| AP 4 | SSID | V4 |
| … … | … … | … … |

FIG. 2B

| DEVICE 270 | PORT/TYPE 280 | VLAN CONFIGURED 290 |
|---|---|---|
| CORE SWITCH | PORT 1 | V1, V2 |
| CORE SWITCH | PORT 2 | V3 |
| ACCESS SWITCH A | UPLINK | V1, V2 |
| ACCESS SWITCH B | UPLINK | V3 |
| AP 1 | MANAGEMENT | V1 |
| AP 1 | SSID | V2 |
| AP 2 | MANAGEMENT | V1 |
| AP 2 | SSID | V2 |
| AP 3 | MANAGEMENT | V3 |
| AP 3 | SSID | V4 |
| AP 4 | MANAGEMENT | V3 |
| AP 4 | SSID | V4 |
| ... ... | ... ... | ... ... |

DISTRIBUTED NETWORK LAYER MOBILITY FOR UNIFIED ACCESS NETWORKS

FIELD

The present disclosure relates to wireless mobility. In particular, the present disclosure relates to distributed network layer mobility for unified access networks.

BACKGROUND

Most of the current network layer (e.g., Layer 3 in OSI model) mobility solutions in controller-less networks involve tunneling of client traffic, including broadcast traffic, from a foreign network to a home network, for example, through a GRE tunnel. Thus, the tunneling of client traffic generates unnecessary load on a switching network and the participating access points. The problem is aggravated by the increase in the total number of access points and the total number of supported sub-networks as the wireless network scales up. This is because when more wireless local area network (WLAN) clients roam from a home network to a foreign network, more tunnels would need to be created between the home network and the foreign network, which generates additional WLAN network load caused by traffic originated from or destined to the roaming clients in the foreign network. With the increased prevalence of wireless access in today's mobile world, it is important to holistically reduce the total load on components of the switching network.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to home VLAN identification for roaming clients, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless mobility. In particular, the present disclosure relates to distributed network layer mobility for unified access networks.

Unlike conventional layer 3 mobility solutions in controller-less networks that involve tunneling of client traffic, including broadcast traffic, embodiments of the present disclosure eliminate the need for a secure tunnel between a home network device and a foreign network device when a client roams from the home network device to the foreign network device. Therefore, embodiments of the present disclosure reduce the unnecessary traffic load on the switching network as well as the participating access points.

With the solution provided herein, a network device receives an association request from a client device in a wireless network; identifies a first wireless virtual local area network (VLAN) that the client device is assigned to; and, allows traffic to or from the client device to be transmitted via the network device on the first wireless VLAN, wherein traffic on at least a second wireless VLAN is transmitted via the network device and segregated from the traffic on the first wireless VLAN.

In some embodiments, both the first wireless VLAN and the second wireless VLAN are statically pre-configured to be supported by the network device. In other embodiments, the first wireless VLAN is dynamically enabled in response to the client device roaming from its home network device to associate with the network device.

In some embodiments, the disclosed network device also disallows traffic on the first wireless VLAN if there is no active client device assigned to the first wireless VLAN is actively associated with the network device. Furthermore, in response to identifying the first wireless VLAN, the disclosed network device may send a message to an uplink network switching device to notify the uplink network switching device to allow traffic on the first wireless VLAN to be transmitted via the port that the network device is connected to.

In some embodiments, the first wireless VLAN is identified based on client history including a probable location of the client device when the client device is connected to the wireless network. In some embodiments, the first wireless VLAN is assigned based on a response message from a wireless network authentication server.

Network Computing Environment

Figure 1:
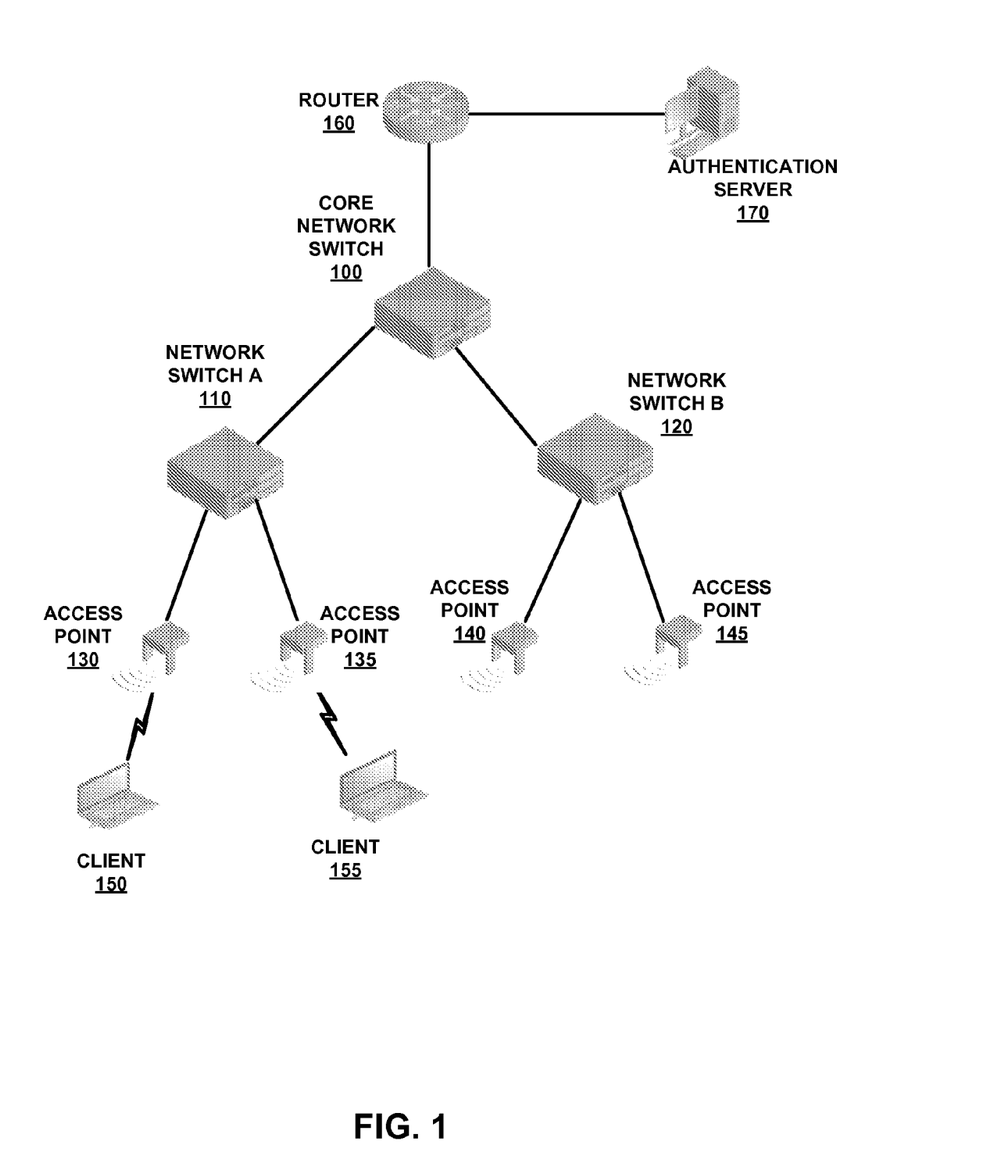
FIG. 1 is a diagram illustrating an exemplary wireless network computing environment according to embodiments of the present disclosure.

FIG. 1 shows an exemplary wireless network computing environment according to embodiments of the present disclosure. FIG. 1 includes at least a router 160, an authentication server 170, a core network switch 100, and at least two other network switches—network switch A 110 and network switch B 120. Furthermore, each network switch is interconnected with a plurality of access points (APs). In the illustrated example, network switch A 110 is interconnected with access point 130 and access point 135, and network switch B 120 is interconnected with access point 140 and access point 145. The plurality of access points serves a number of client devices, such as client 150 and client 155.

Network switch 100, 110 and/or 120 is a computer networking device that connects network segments or network devices. Network switch 100, 110 and/or 120 may include a multi-port network bridge that processes and routes data at the data link layer (e.g., layer 2 of the OSI model), or switches that additionally process data at the network layer (e.g., layer 3 of the OSI model). Moreover, access point 130, 135, 140 and/or 145 generally refers to a network device that allows wireless clients to connect to a wired network.

Furthermore, core network switch 100 can be connected to router 160, which can forward traffic to and receive traffic from Internet. Router 160 generally is a network device that forwards data packets between different networks, and thus creating an overlay internetwork. A router is typically connected to two or more data lines from different networks.

When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

Authentication server 170 can optionally be configured to police network traffic to/from Internet. In some embodiments, security policies can be configured at authentication server 170 to dictate the network access, protocols, and applications that are permitted or denied, as well as levels of network services that are provided. Such security policies can be actively enforced in a mobile environment with policies enforced upon mobile clients as they roam within one or more mobility domains in wireless networks.

Assuming that in FIG. 1, core network switch 100 supports virtual local area networks (VLANs) V1, V2, V3, and V4. Further, network switch A 110, which serves as an access switch for access points 130 and 135, supports VLANs V1 and V2. Moreover, network switch B 120, which serves as an access switch for access points 140 and 145, supports VLANs V3 and V4.

For illustration purposes only, assuming that access point 130 and access point 135 are configured with both V1 and V2, whereas V1 is the management or native VLAN for transmitting control traffic, e.g., via a wired interface, and V2 is the SSID VLAN for transmitting wireless traffic. Similarly, assuming that access point 140 and access point 145 are configured with both V3 and V4, whereas V3 is the management or native VLAN and V4 is the SSID VLAN.

In a hypothetical scenario, client 150 is initially associated with its home access point 140 on its home VLAN V4, and thereafter roams from access point 140 to access point 130. Thus, client 150 is currently associated with access point 130 on VLAN V2. Likewise, client 155 is initially associated with its home access point 145 on its home VLAN V4, and thereafter roams from access point 145 to access point 135. Thus, client 155 is now associated with access point 135 on VLAN V2.

Figure 2A:
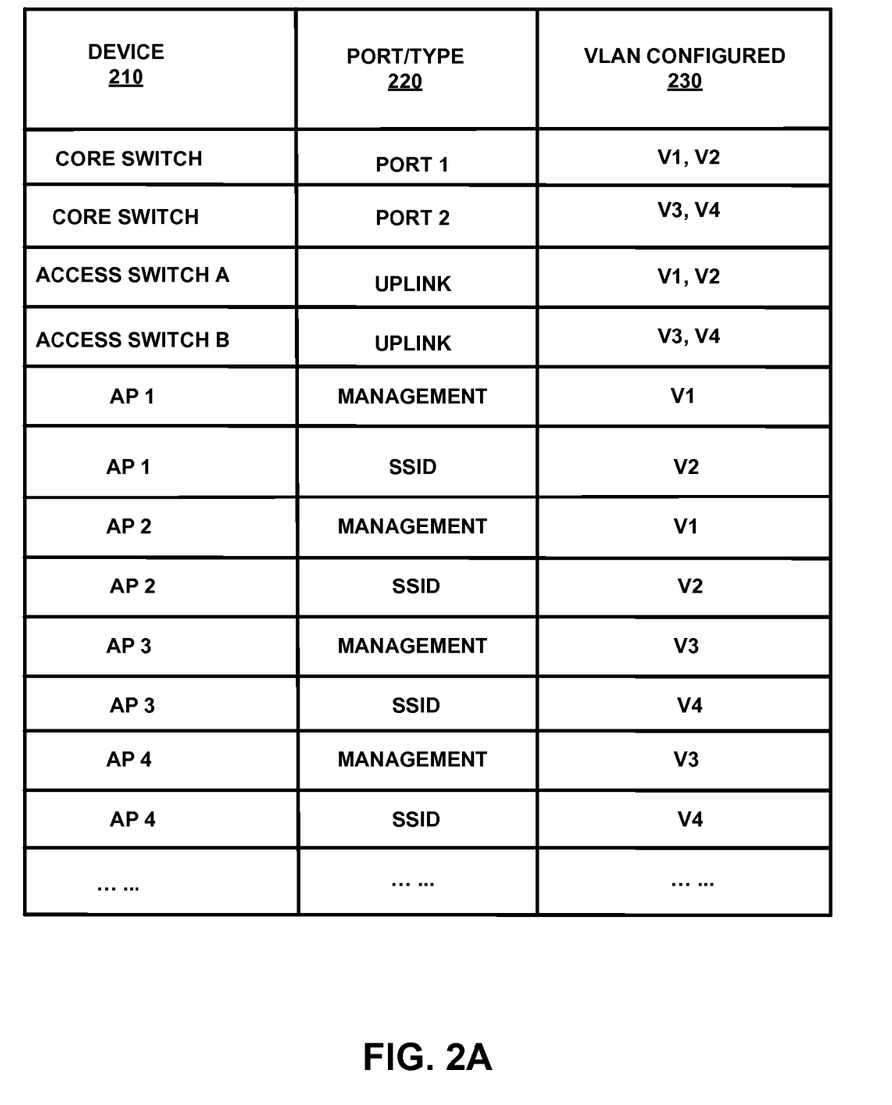
FIGS. 2A-2C illustrate exemplary VLAN configurations according to embodiments of the present disclosure.

FIG. 2A illustrates an exemplary VLAN configuration in the above hypothetical scenario. FIG. 2A includes at least three columns: device 210, port/type 220, and VLAN Configured 230. As shown in FIG. 2A, port 1 of the core switch is configured with VLANs V1 and V2; and port 2 of the core switch is configured with VLANs V3 and V4. Accordingly, the uplink of access switch A is configured with VLANs V1 and V2; and the uplink of access switch B is configured with VLANs V3 and V4. Moreover, AP1 and AP2 are within the first sub-network and are connected to access switch A, whereas AP3 and AP4 are within the second sub-network and are connected to access switch B. Further, AP1 is configured with two VLANs, namely a management or native VLAN V1 and an SSID VLAN (e.g., wireless client VLAN) V2. Similarly, AP2 is also configured with two VLANs, namely a management or native VLAN V1 and an SSID VLAN (e.g., wireless client VLAN) V2. On the other hand, AP3 is configured with a management or native VLAN V3 and an SSID VLAN (e.g., wireless client VLAN) V4. Likewise, AP3 is configured with a management or native VLAN V3 and an SSID VLAN (e.g., wireless client VLAN) V4, etc.

In FIG. 1, client 150 roams from access point 140 to access point 130, resulting in a GRE tunnel to be established between access point 140 and access point 130. All broadcast traffic in VLAN V4 is transmitted via a secure tunnel (e.g., a GRE tunnel) to client 150 through access point 130 and network switch A 110. Similarly, because client 155 roams from access point 145 to access point 135, all broadcast traffic in VLAN V4 is transmitted via a secure tunnel (e.g., a GRE tunnel) to client 155 through access point 135 and network switch B 135.

Note that, layer 3 roaming is necessary when the SSID VLAN (e.g., V4) of the home AP (e.g., access point 140) that a client (e.g., client 150) is associated to is not same as the SSID VLAN (e.g., V2) of a foreign AP (e.g., access point 130) that the client roams to. When the roaming of the client from home AP to foreign AP occurs, all downstream and upstream client traffic (e.g. traffic to and from client 150) will need to be transmitted between an AP (e.g., access point 140) which has access to the home VLAN of the client (e.g., V4) and the AP that the client is currently connected with (e.g., access point 130). Thus, all unicast traffic to and/or from the client will need to be transmitted to the foreign access point via a secure tunnel and through core switch fabric to/from the Internet. As a result, the unicast traffic to/from the roaming client has to take a longer route compared to the route that the same client would take when associated with its home access point.

Also, multicast or broadcast traffic needs to be transmitted to the foreign network through network switch A 110 using the switching fabric via core network switch 100. Meanwhile, the same multicast or broadcast traffic also is transmitted to the home network through network switch B 120 and forwarded to the foreign network through the secure tunnel between the home access point and the foreign access point. Note that, any traffic in the secure tunnel is transmitted through access switch A 110, access switch 120, and core switch 100 in the illustrated example. Therefore, the duplication of multicast/broadcast transmissions as well as the longer route for the unicast traffic not only cause extra traffic load on the network switches, but also undermine the purpose of VLAN segregation.

Therefore, the total traffic load on network switch A 110 is:
(all unicast traffic by clients connected to access switch A 110)+(broadcast traffic on VLAN V1)+(broadcast traffic on VLAN V2)+2*(broadcast traffic on VLAN V4)

In general, for 'n' GRE tunnels passing through an access switch, e.g., network switch A 110, the total traffic load on the access switch is:
(all unicast traffic by clients connected to access switch)+(broadcast traffic on VLAN V1)+(broadcast traffic on VLAN V2)+n (broadcast traffic on VLAN V4)

Note that, in a network without VLAN separation, e.g., where all access points have the same SSID VLAN, e.g., VLAN Vx, the total traffic load on network switch A 110 is:
(all unicast traffic by clients connected to network switch A 110)+(broadcast traffic on VLAN V1)+(broadcast traffic on VLAN Vx)

However, (broadcast traffic on VLAN Vx) is roughly equivalent to (broadcast traffic on VLAN V2)+(broadcast traffic on VLAN V4) in the original network. Thus, network switch A 110 in the original network has an additional load of (n−1) (broadcast traffic on VLAN V4).

Also, note that, even the core switch fabric, e.g., core network switch 100, which has already been handling all broadcast traffic on VLAN V4, is handling an additional traffic load.

In general, any reduction in switch load through VLAN segregation is lost with just one client roaming. In a high mobility scenario when multiple clients roam simultaneously, the traffic load on the access switches only gets worse; and, the core switch fabric is handling a much higher traffic load than it is supposed to handle.

Static Approach to VLAN Segregation

In one embodiment, all SSID or wireless VLANs are statically enabled on all access switches in the networks, and thus allowing the SSID/wireless VLANs on all ports of all access points. In FIG. 1, assuming that VLANs V2 and V3 are SSID or wireless VLANs. According to this embodiment, access switch A 110, access point 130, and access point 135 are configured with VLANs V1, V2 and V4. Similarly, access switch B 120, access point 140, and access point 145 are configured with VLANs V2, V3 and V4.

Figure 2B:
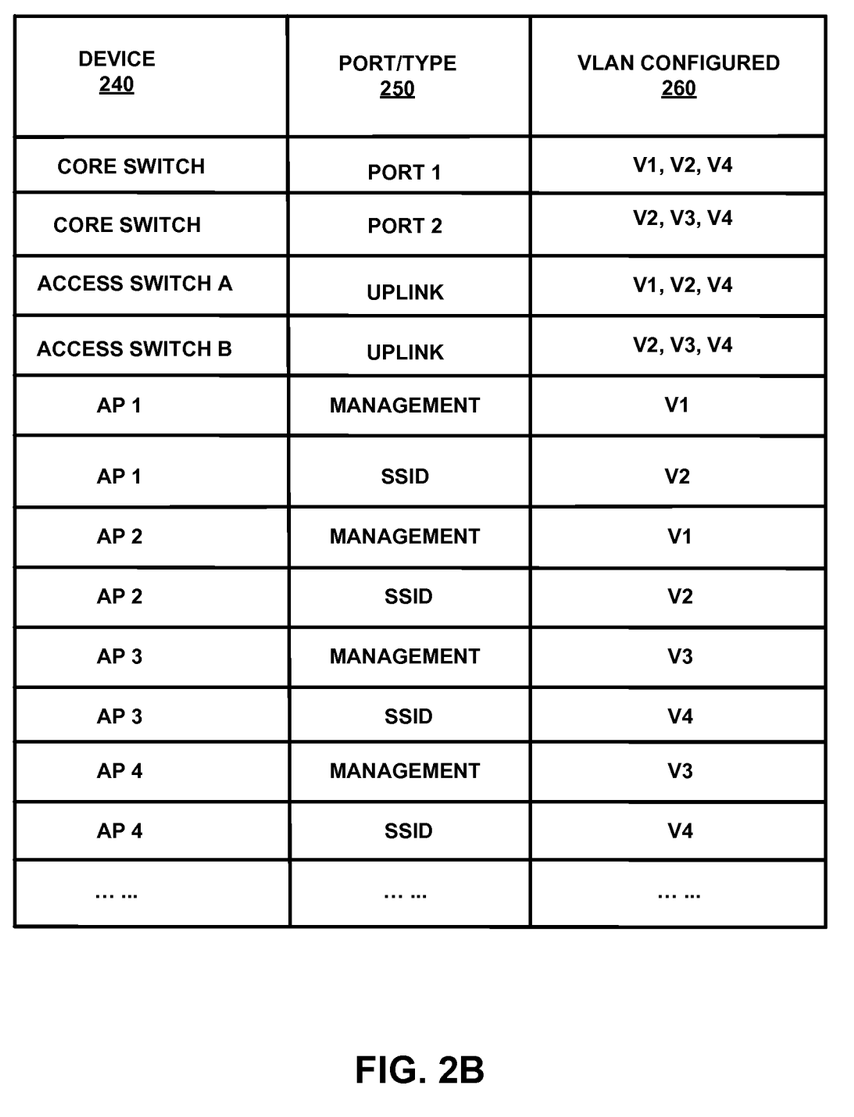

FIG. 2B illustrates an exemplary VLAN configuration according to embodiments of the present disclosure. FIG. 2B includes at least three columns: device 240, port/type 250, and VLAN Configured 260. As shown in FIG. 2B, port 1 of the core switch is statically configured with VLANs V1, V2, and V4; and port 2 of the core switch is statically configured with VLANs V2, V3 and V4. Accordingly, the uplink of access switch A is statically configured with VLANs V1, V2, and V4; and the uplink of access switch B is statically configured with VLANs V2, V3 and V4. Moreover, AP1 and AP2 are connected to access switch A, whereas AP3 and AP4 are connected to access switch B. Further, AP1 is configured with two VLANs, namely a management or native VLAN V1 and an SSID VLAN (e.g., wireless client VLAN) V2. Similarly, AP2 is also configured with two VLANs, namely a management or native VLAN V1 and an SSID VLAN (e.g., wireless client VLAN) V2. On the other hand, AP3 is configured with a management or native VLAN V3 and an SSID VLAN (e.g., wireless client VLAN) V4. Likewise, AP4 is configured with a management or native VLAN V3 and an SSID VLAN (e.g., wireless client VLAN) V4, etc. Note that, although both SSID VLANs V2 and V4 are configured on access switch A and access switch B, the wireless client traffic on each VLAN remains segregated during transmissions.

Therefore, with the static configuration according to this embodiment, the layer 3 roaming is converted to a layer 2 roaming with VLAN mobility enabled. Specifically, the client (e.g., client 150), upon roaming from home access point 140 to foreign access point 130 will continue to use its home VLAN (e.g., VLAN V4). Note that, the client's home VLAN (e.g., VLAN V4) is also valid in the foreign access point 130 that the client is currently associated with, as well as access switch 110. Therefore, the need for a secure tunnel (e.g., a GRE tunnel) between a home access point and a foreign access point for a roaming client is eliminated.

Thus, according to this embodiment, the traffic load on access switch A will be:
(all unicast traffic by clients connected to access switch A)+(broadcast traffic on VLAN V1)+(broadcast traffic on VLAN V2)+(broadcast traffic on VLAN V4)

Note that, the overall traffic load remains same irrespective of the number of roaming clients, because there are not multiple copies of the same multicast or broadcast packet getting transmitted on the same VLAN. In general, according to the static approach to VLAN segregation, all wireless client VLANs are statically configured and enabled on all access switches across multiple sub-networks in a network system.

Dynamic Approach to VLAN Segregation

According to another embodiment of the present disclosure, VLANs may be dynamically turned on or off in order to reduce the traffic load on the core switch and access switches in the network. For example, in FIG. 1, access switch A 110, access point 130, and access point 135 may initially be enabled with only management or native VLAN V1. Similarly, access switch B 120, access point 140, and access point 145 initially be enabled with only VLAN V3.

When a wireless client (e.g., client 150) associates with its home access point (e.g., access point 140), the SSID VLAN (or wireless client VLAN for access point 140) V4 is enabled on both access point 140 and access switch B 120. Subsequently, assuming that client 150 roams from its home access point 140 to foreign access point 130. When client 150 disassociates with home access point (e.g., access point 140), the corresponding SSID VLANs on the home access point (e.g., SSID VLAN V4) are disabled on the home access point (e.g., access point 140). Also, when client 150 associates with a foreign access point (e.g., access point 130), VLAN V4, which is client 150's home VLAN, is enabled on the foreign access point (e.g., access point 130) and foreign switch (e.g., access switch A 110).

Note that, the above process only applies when an existing client roams from a home network to a foreign network. When a new client associates with access point 130, access point 130 becomes the home access point of the new client and follows the same VLAN configuration process for home APs. In this case, access point 130 will have its SSID VLAN (or wireless client VLAN) V2 rather than VLAN V4 enabled upon a new association being established from a new client.

In some embodiments, such dynamic VLAN segregation may be implemented via standard networking protocols, such as Generic Attribute Registration Protocol (GARP) Generic VLAN Registration Protocol (GVRP), Multiple VLAN Registration Protocol (MVRP), VLAN Trunking Protocol (VTP), Link Layer Discovery Protocol (LLDP) extension, etc. In other embodiments, dynamic VLAN segregation may use vendor-specific proprietary interfaces between the access points, access switches and their uplink core switch.

In some scenarios when a large number of clients are roaming to the foreign network, the traffic load on all switches will be similar to the static approach to VLAN segregation as described in the previous section. However, in an average scenario, the traffic loads on switches according to dynamic approach to VLAN segregation tends to be lower than the static approach. Similar to static approach to VLAN segregation, dynamic approach to VLAN segregation also eliminates the needs for any secure tunnel to be established between the home sub-network and the foreign sub-network.

For illustration purposes only, assuming that mobile client 150 is initially associated with home access point 140, and is configured with an IP address of 10.1.10.101 on VLAN V10 whose default gateway is 10.1.10.1. Furthermore, both uplink of access switch B 120 and port 2 of core switch 100 (which access switch B is coupled with) are enabled with VLAN V10.

On the other hand, assuming that foreign access point 130 has a number of wireless clients associated with its wireless VLAN V20 whose default gateway is 10.1.20.1. Thus, initially, port 1 of core switch 100 and uplink of access switch A 130 both have VLAN V20 enabled for home network client traffic.

Now, assuming that client 150 roams from its home network to the foreign network, and associates with foreign access point 130. Based on the IP address 10.1.10.101 of client 150, access point 130 identifies that client 150 as a roaming client whose home wireless VLAN is V10. Then, access point 130 sends an uplink notification message to access switch A 130, notifying access switch A 130 that a roaming client on V10 has established a connection with access point 130. When access switch A 130 receives the notification message, access switch A 130 checks whether the requested VLAN V10 has been enabled. If not, access switch A 130 will dynamically enable VLAN V10 on both its uplink port and the port to which access point 130 is connected.

Note that, the dynamic approach to VLAN segregation can be incrementally configured from the static approach to VLAN segregation. Therefore, a network administrator may configure all wireless client VLANs on all access points and switches in the wireless network. Subsequently, based on whether any roaming client exists, each pre-configured wireless client VLAN can be dynamically enabled or disabled at one or more ports and/or network devices.

In some embodiments, each access switch in the wireless network maintains a record of the connected foreign clients. When all roaming clients disassociate with access point 130, access point 130 will disable VLAN V10 and notify its uplink access switch A 120.

VLAN Load Balancing to Improve Average Load

According to another embodiment of the present disclosure, VLANs may be dynamically turned on or off in order to reduce the traffic load on the core switch and access switches in the network. Specifically, the home VLAN of a client is disassociated from the SSID or wireless VLAN of the access point. Every client device would eventually have a location which is its home.

Figure 2C:
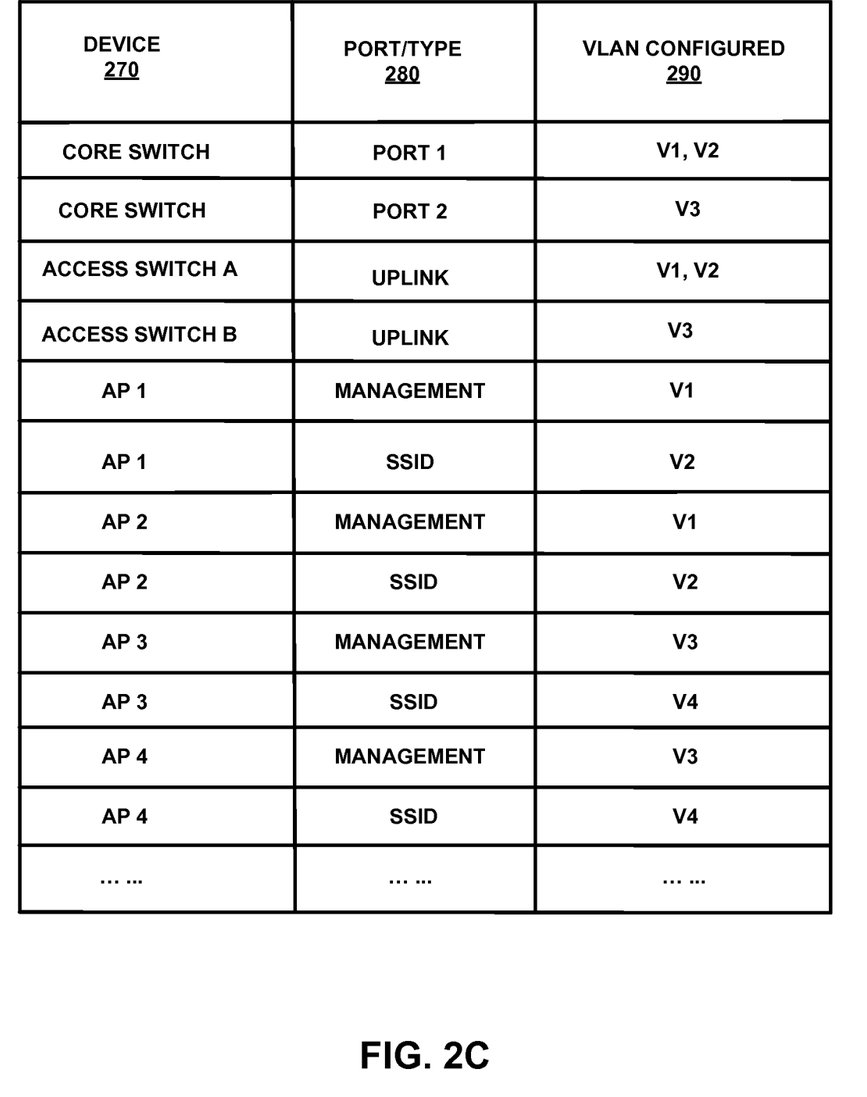

FIG. 2C illustrates an exemplary VLAN configuration according to embodiments of the present disclosure. FIG. 2C includes at least three columns: device 270, port/type 280, and VLAN Configured 290. As shown in FIG. 2C, port 1 of the core switch is initially configured with VLANs V1 and V2; and port 2 of the core switch is initially configured with VLAN V3. Accordingly, the uplink of access switch A is initially configured with VLANs V1 and V2; and the uplink of access switch B is initially configured with VLAN V3. Moreover, AP1 and AP2 are connected to access switch A, whereas AP3 and AP4 are connected to access switch B. AP1 and AP2 are located between rows E and F on floor I; and, AP3 and AP4 are located between rows R and S on floor II.

Further, AP1 is configured with two VLANs, namely a management or native VLAN V1 and an SSID VLAN (e.g., wireless client VLAN) V2. Similarly, AP2 is also configured with two VLANs, namely a management or native VLAN V1 and an SSID VLAN (e.g., wireless client VLAN) V2. On the other hand, AP3 is configured with a management or native VLAN V3 and an SSID VLAN (e.g., wireless client VLAN) V4. Likewise, AP4 is configured with a management or native VLAN V3 and an SSID VLAN (e.g., wireless client VLAN) V4, etc.

For illustration purposes only, in FIG. 1, assuming that client 150 belongs to an employee seating at Cube E1 in Floor I; and that, the access points located in the vicinity (e.g., access points 130 and 135 are both located between rows E & F on Floor I) are configured with the SSID VLAN V2. Thus, client 150 is assigned a home VLAN V2, which is used as its VLAN even when it associates to access point 140. Also, client 155 belongs to another employee seating at Cube E2 on Floor I, and is assigned to home VLAN V2.

When client 150 connects to access point 140, it is assigned to VLAN V2, even though the SSID VLAN of access point 140 is V4. The rationale behind this VLAN assignment is—it is expected that the client will eventually spend most of its time being connected to one of the access points near Floor I, Cube E1, all of which have the SSID VLAN V2. Therefore, when client roams to access point 130 later, client 150 can continue to use VLAN V2, just like the other non-roaming clients connected to access point 130 or 135 (e.g., client 155 in FIG. 1).

By using a VLAN associated with a probable location of the client, the chances of this client connecting to an access point with an SSID VLAN that is different from its home VLAN is low, which eventually reducing the number of VLANs simultaneously being active on a given access switch.

Derive Home VLAN Based on Authentication Response

According to another embodiment of the present disclosure, assignment of home VLAN can be achieved by using VLAN derivation. Specifically, the home VLAN of each client is configured in an authentication server, such as an IEEE 802.1x authentication server, which is utilized by the access points.

Alternatively, the home VLAN of the client may be dynamically derived from the client history, which the system maintains, according to the floor area where the client spends most time.

Note that, in some embodiments, this approach is enabled only for devices owned by the employee. Guest devices do not have an identified home VLAN. Thus, the SSID or wireless VLAN of the first access point that a guest device associates with may be used as the VLAN for the traffic to and from the guest device. For the guest devices or clients which do not have an identified area or VLAN where they spend significant time periods while connected to the network, a separate VLAN for these devices may be created and assigned to these devices. These devices will be a minority of devices in the network, and hence broadcast on them whether statically or dynamically enabled across the network would not create too much overhead.

Processes for Distributed Network Layer Mobility for Unified Access Networks

Figure 3:
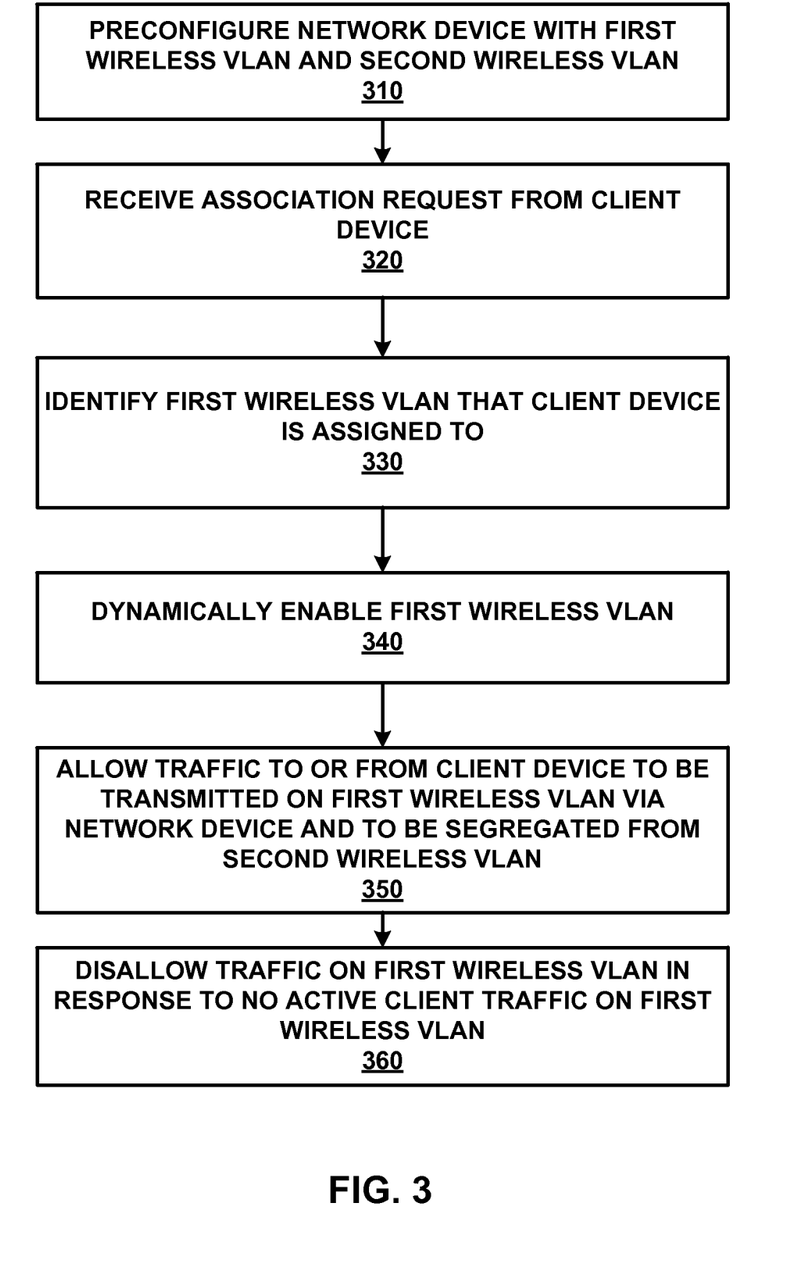
FIG. 3 is a flowchart illustrating an exemplary process of distributed network layer mobility for unified access networks according to embodiments of the present disclosure.

FIG. 3 is a flowchart illustrating an exemplary process of distributed network layer mobility for unified access networks according to embodiments of the present disclosure.

During operations, the disclosed network device is pre-configured with a first wireless VLAN and a second wireless VLAN (operation 310). In some embodiments, each network device is statically pre-configured with all wireless or SSID VLANs in the wireless network.

Subsequently, the disclosed network device receives an association request from a client device (operation 320). The disclosed network device then identifies the first wireless VLAN that the client device is assigned to (operation 330). Note that, the VLAN assigned to the client device may be different from the SSID VLAN of the network device if the client devices roams from another access point (e.g., the home access point of the client device) to associate with the disclosed access point (which serves as the foreign access point for the client device). Next, the disclosed network device may dynamically enable the first wireless VLAN (operation 340).

Thereafter, the network device can allow traffic to or from the client device to be transmitted on the first wireless VLAN (which is the home VLAN for the roaming client) via the network device, and allow traffic on the first wireless VLAN to be segregated from traffic on the second wireless VLAN (operation 350). In order to do so, the network device can send a message to an uplink network switching device to notify the uplink network switching device to allow traffic on the first wireless VLAN to be transmitted via the port that the network device is connected to.

In some embodiments, in response to no active client traffic on the first wireless VLAN (e.g., after the last client on the first wireless VLAN disassociates with the network device), the network device will disallow traffic on the first wireless VLAN (operation 360).

Systems for Distributed Network Layer Mobility for Unified Access Networks

Figure 4:
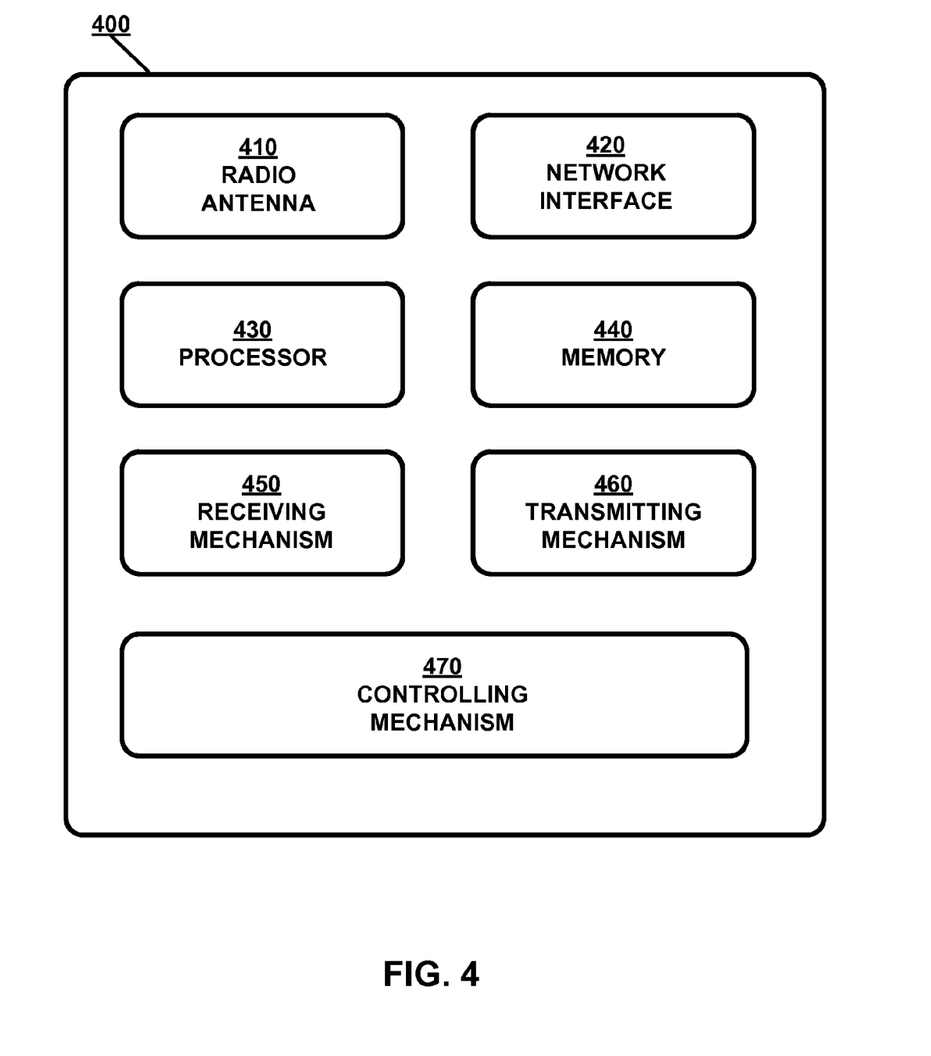
FIG. 4 is a block diagram illustrating an exemplary system for distributed network layer mobility for unified access networks according to embodiments of the present disclosure.

FIG. 4 is a block diagram illustrating an exemplary system for distributed network layer mobility for unified access networks according to embodiments of the present disclosure.

Network device 400 includes at least a network interface 420 capable of communicating to a wired or wireless network, a processor 430 capable of processing computing instructions, a memory 440 capable of storing instructions and data, and optionally one or more radio antennas 410 capable of either transmitting or receiving radio signals or both. Moreover, network device 400 further includes a receiving mechanism 450, a transmitting mechanism 460, and a controlling mechanism 470, all of which are coupled to processor 430 and memory 440 in network device 400. Network device 400 may be used as a client system, or a server system, or may serve as node in a distributed or a cloud computing environment.

Radio antenna 410 may be any combination of known or conventional electrical components for receipt of signaling, including but not limited to, transistors, capacitors, resistors, multiplexers, wiring, registers, diodes or any other electrical components known or later become known.

Network interface 420 can be any communication interface, which includes but is not limited to, a modem, token ring interface, Ethernet interface, wireless IEEE 802.11 interface (e.g., IEEE 802.11n, IEEE 802.11ac, etc), cellular wireless interface, satellite transmission interface, or any other interface for coupling network devices. In some embodiments, network interface 420 may be software-defined and programmable, for example, via an Application Programming Interface (API), and thus allowing for remote control of the network device 400.

Processor 430 can include one or more microprocessors and/or network processors. Memory 440 can include storage components, such as, Dynamic Random Access Memory (DRAM), Static Random Access Memory (SRAM), etc.

Receiving mechanism 450 generally receives one or more network messages via network interface 420 from a distribution system or radio antenna 410 from a wireless client over a wireless communication channel. The received network messages may include, but are not limited to, requests and/or responses, beacon frames, management frames, control path frames, and so on. Each message may comprise one or more data packets, for example, in the form of IP packets. In some embodiments, receiving mechanism 450 receives from the foreign agent a home agent discovery request including the Media Access Control (MAC) address of the mobile client.

Transmitting mechanism 460 generally transmits messages, which include, but are not limited to, requests and/or responses, beacon frames, management frames, control path frames, and so on.

Controlling mechanism 470 generally controls transmission of traffic. Specifically, controlling mechanism 470 identifies a first wireless virtual local area network (VLAN) that the client device is assigned to; and, allows traffic to or from the client device to be transmitted via the network device on the first wireless VLAN, wherein traffic on at least a second wireless VLAN is transmitted via the network device and segregated from the traffic on the first wireless VLAN.

In some embodiments, both the first wireless VLAN and the second wireless VLAN are statically pre-configured to be supported by network device 400. In other embodiments, the first wireless VLAN is dynamically enabled in response to the client device roaming from its home network device to associate with network device 400.

In some embodiments, controlling mechanism 470 also disallows traffic on the first wireless VLAN if there is no active client device assigned to the first wireless VLAN is actively associated with network device 400.

In some embodiments, the first wireless VLAN is identified based on client history including a probable location of the client device when the client device is connected to the wireless network. In some embodiments, the first wireless VLAN is assigned based on a response message from a wireless network authentication server.

Therefore, receiving mechanism 450, transmitting mechanism 460, and controlling mechanism 470 often collectively operate with each other to provide for distributed network layer mobility for unified access networks, whereby the need for a secure tunnel is eliminated. For example, in response to receiving mechanism 450 receives an association request from a client device, controlling mechanism 470 identifies a first wireless virtual local area network (VLAN) that the client device is assigned to. Furthermore, in response to controlling mechanism 470 identifying the first wireless VLAN, transmitting mechanism 460 may send a message to an uplink network switching device to notify the uplink network switching device to allow traffic on the first wireless VLAN to be transmitted via the port that the network device is connected to.

According to embodiments of the present disclosure, network services provided by network device 400, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
receiving, by a foreign access point, an association request from a client device that is initially associated with a home access point, wherein the foreign access point is connected to a first uplink switch and the home access point is connected to a second and different uplink switch, wherein the client device is assigned to a first wireless virtual local area network (VLAN) by the home access point, the first wireless VLAN corresponding to a first service set identifier (SSID) uniquely associated with the home access point;
identifying, by the foreign access point, the first wireless VLAN to which the client device was previously assigned;
configuring, on the foreign access point, the first wireless VLAN corresponding to the first SSID uniquely corresponding to the home access point;
transmitting, via the foreign access point, traffic to or from the client device on the first wireless VLAN while transmitting traffic to or from at least another client device on a second and different wireless VLAN, the at least another client device being associated with the foreign access point, and the second and different wireless VLAN corresponding to a second SSID uniquely corresponding to the foreign access point.

2. The method of claim 1, wherein both the first wireless VLAN and the second wireless VLAN are statically pre-configured to he supported by the foreign access point.

3. The method of claim 1, wherein the first wireless VLAN is dynamically enabled in response to the client device roaming from its home access point to associate with the foreign access point.

4. The method of claim 1, further comprising:
disallowing traffic, by the foreign access point, on the first wireless VLAN in response to no active client device assigned to the first wireless VLAN being actively associated with the network device.

5. The method of claim 1, further comprising:
in response to identifying the first wireless VENN sending a message to the first uplink switch to notify the first uplink switch to allow traffic on the first wireless VLAN to be transmitted via a port that the foreign access point is connected to.

6. The method of claim 1, further comprising:
identifying the first wireless VLAN based on a client history including a probable location of the client device when the client device is connected to the wireless network.

7. The method of claim 1, further comprising:
assigning the first wireless VLAN based on a response message from a wireless network authentication server.

8. A network device comprising:
a processor;
a memory;
a receiving mechanism coupled to the processor, wherein the receiving mechanism is configured to receive an association request by a foreign access point from a client device that is initially associated with home access point, wherein the foreign access point is connected to a first uplink switch and the home access point is connected to a second and different uplink switch, wherein the client device is assigned to a first wireless virtual local area network (VLAN) by the home access point, the first wireless VLAN corresponding to a first service set identifier (SSID) uniquely associated with the home access point;

a controlling mechanism coupled to the processor, wherein the controlling mechanism is con
- identify the first wireless VLAN to which the client device was previously assigned;
- configure, on the foreign access point, the first wireless VENN corresponding to the first SSID uniquely corresponding to the home access point;
- transmit traffic to or from the client device on the first wireless VLAN while transmitting traffic to or from at least another client device on a second and different wireless VLAN, the at least another client device being associated with the foreign access point, and the second and different wireless VLAN corresponding to a second SSID uniquely corresponding to the foreign access point.

9. The network device of claim 8, wherein both the first wireless VLAN and the second wireless VLAN are statically pre-configured to be supported by the foreign access point.

10. The network device of claim 8, wherein the first wireless VLAN is dynamically enabled in response to the client device roaming from its home access point to associate with the foreign access point.

11. The network device of claim 8, wherein the controlling mechanism is configured to further:
- disallow traffic on the first wireless VLAN in response to no active client device assigned to the first wireless VENN being actively associated with the foreign access point.

12. The network device of claim 8, further comprising a transmitting mechanism coupled to the processor, wherein the transmitting mechanism is to:
- in response to identifying the first wireless VLAN, send a message to the first uplink switch to notify the first uplink switch to allow traffic on the first wireless VLAN to he transmitted via a port that the foreign access point is connected to.

13. The network device of claim 8, wherein the controlling mechanism is further configured to:
- identify the first wireless VLAN based on a client history including a probable location of the client device when the client device is connected to the wireless network.

14. The network device of claim 8, wherein the controlling mechanism is further configured to:
- assign the first wireless VLAN based on a response message from a wireless network authentication server.

15. A non-transitory computer-readable storage medium storing embedded instructions that are executed by one or more mechanisms implemented within a network device to:
- receive an association request by a foreign access point from a client device that is initially associated with a home access point, wherein the client device is assigned to a first wireless virtual local area network (VLAN) by the home access point wherein the foreign access point is connected to a first uplink switch and the home access point is connected to a second and different uplink switch;
- identify the first wireless VLAN to which the client devices was previously assigned;
- configure on the foreign access point the first wireless VLAN corresponding to the first SSID uniquely corresponding to the home access point;
- transmit, via the foreign access point, traffic to or from the client device on the first wireless VLAN while transmitting traffic to or from at least another client device on a second and different wireless VLAN, the at least another client device being associated with the foreign access point, and the second and different wireless VLAN corresponding to a second SSID uniquely corresponding to the foreign access point.

16. The non-transitory computer-readable storage medium of claim 15, wherein both the first wireless VLAN and the second wireless VLAN are statically pre-configured to he supported by the foreign access point.

17. The non-transitory computer-readable storage medium of claim 15, wherein the first wireless VLAN is dynamically enabled in response to the client device roaming from its home access point to associate with the foreign access point.

18. The non-transitory computer-readable storage medium of claim 15, wherein the one or more mechanisms are further to execute the instructions to:
- disallow traffic on the first wireless VLAN in response to no active client device assigned to the first wireless VENN being actively associated with the foreign access point.

19. The non-transitory computer-readable storage medium of claim 15, wherein the one or more mechanisms are further to execute the instructions to:
- in response to identifying the first wireless VLAN, send a message to the first uplink switch to notify the first uplink switch to allow traffic on the first wireless VLAN to be transmitted via a port that the foreign access point is connected to.

20. The non-transitory computer-readable storage medium of claim 15, wherein the one or more mechanisms are further to execute the instructions to:
- identify the first wireless VLAN based on client history including a probable location of the client device when the client device is connected to the wireless network.

21. The non-transitory computer-readable storage medium of claim 15, wherein the one or more mechanisms are further to execute the instructions to:
- assign the first wireless VLAN based on a response message from a wireless network authentication server.

* * * * *